United States Patent
Tofighbakhsh et al.

(10) Patent No.: US 11,575,566 B2
(45) Date of Patent: *Feb. 7, 2023

(54) TELECOMMUNICATION NETWORK ANALYTICS PLATFORM

(71) Applicants: AT&T Intellectual Property I, L.P., Atlanta, GA (US); Hossein Besharatian, Dickerson, MD (US)

(72) Inventors: Mostafa Tofighbakhsh, Cupertino, CA (US); Hossein Besharatian, Dickerson, MD (US)

(73) Assignees: AT&T Intellectual Property I, L.P., Atlanta, GA (US); Hossein Besharatian, Dickerson, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/334,082

(22) Filed: May 28, 2021

(65) Prior Publication Data

US 2021/0288872 A1 Sep. 16, 2021

Related U.S. Application Data

(63) Continuation of application No. 15/266,740, filed on Sep. 15, 2016, now Pat. No. 11,025,485.

(51) Int. Cl.
*H04L 41/0803* (2022.01)
*H04L 67/10* (2022.01)
(Continued)

(52) U.S. Cl.
CPC ........ *H04L 41/0803* (2013.01); *H04L 41/046* (2013.01); *H04L 41/0863* (2013.01); *H04L 43/04* (2013.01); *H04L 43/06* (2013.01); *H04L 43/065* (2013.01); *H04L 67/10* (2013.01); *H04M 15/41* (2013.01)

(58) Field of Classification Search
CPC ..... H04L 43/04; H04L 41/0803; H04L 41/14; H04L 41/142; H04L 43/065; H04L 43/06; H04L 67/10; H04L 41/046; H04L 41/0863
See application file for complete search history.

(56) References Cited

U.S. PATENT DOCUMENTS

9,146,787 B2    9/2015   Zhu et al.
9,332,487 B2    5/2016   Taneja
(Continued)

*Primary Examiner* — Gregory Todd (57) ABSTRACT

Methods, computer-readable media and devices are disclosed for selecting a plurality of network devices to perform a plurality of tasks in accordance with a set of functional network analytics instructions. For example, a processor deployed in a telecommunication network may receive a set of functional network analytics instructions compiled from a set of instructions in accordance with a functional network analytics platform application programming interface. The processor may further, in accordance with the set of functional network analytics instructions, select a plurality of network devices to perform a plurality of tasks, send the plurality of tasks to the plurality of network devices, receive control plane data from the plurality of network devices, correlate the control plane data in accordance with operations defined in the set of functional network analytics instructions to create resulting data, and forward the resulting data to at least one recipient device.

20 Claims, 4 Drawing Sheets

(51) Int. Cl.
  *H04L 41/046*   (2022.01)
  *H04L 41/0859*  (2022.01)
  *H04L 43/065*   (2022.01)
  *H04L 43/06*    (2022.01)
  *H04L 43/04*    (2022.01)
  H04M 15/00      (2006.01)

(56) References Cited

U.S. PATENT DOCUMENTS

| | | | |
|---|---|---|---|
| 10,097,421 B1 * | 10/2018 | Rajagopal | H04L 41/5009 |
| 11,025,485 B2 * | 6/2021 | Tofighbakhsh | H04L 43/065 |
| 2013/0021933 A1 * | 1/2013 | Kowali | H04W 88/18 370/252 |
| 2013/0265894 A1 | 10/2013 | Filsfils et al. | |
| 2014/0280338 A1 | 9/2014 | Metz et al. | |
| 2014/0365634 A1 | 12/2014 | Metz et al. | |
| 2015/0113118 A1 * | 4/2015 | Jain | H04L 41/145 709/224 |
| 2015/0254701 A1 | 9/2015 | Laredo et al. | |
| 2015/0317197 A1 | 11/2015 | Blair | |
| 2015/0347201 A1 | 12/2015 | Zhu et al. | |
| 2016/0050128 A1 | 2/2016 | Schaible et al. | |
| 2016/0062746 A1 | 3/2016 | Chiosi et al. | |
| 2016/0080965 A1 * | 3/2016 | Boyle | H04W 24/10 370/252 |
| 2016/0094641 A1 | 3/2016 | Rahman et al. | |
| 2016/0197799 A1 | 7/2016 | Clemm et al. | |
| 2017/0078157 A1 * | 3/2017 | Zhang | H04L 41/044 |
| 2017/0214694 A1 * | 7/2017 | Yan | H04L 63/0853 |
| 2017/0318087 A1 * | 11/2017 | Qiu | G06F 9/442 |

* cited by examiner

TELECOMMUNICATION NETWORK ANALYTICS PLATFORM

This application is a continuation of U.S. patent application Ser. No. 15/266,740, filed on Sep. 15, 2016, which is now U.S. Pat. No. 11,025,485, which is herein incorporated by reference in its entirety.

The present disclosure relates generally to telecommunication network operations, and more particularly to devices, computer-readable media, and methods for selecting a plurality of network devices to perform a plurality of tasks in accordance with a set of functional network analytics instructions, and devices, computer-readable media, and methods for generating a set of instructions in accordance with a functional network analytics platform application programming interface.

BACKGROUND

Telecommunication networks may generate and collect a large volume of control plane data. For example, call detail records (CDRs) are records produced by network elements which contain details of a call (including voice calls, data sessions, e.g., email, Internet Protocol (IP) traffic, short message service (SMS) messages, and so forth) that passed through such network elements. CDRs and cause codes conform to an industry standard format. For example, each CDR comprises numerous fields containing different information or parameters. To name only a few parameters for illustration, CDR parameters may comprise a cause code, a calling party area code, a calling party phone number, a called party area code, a called party phone number, a date of a call, a time stamp for the start of a call, a time stamp for the end of a call, a time duration of a call, a type of call, a disposition of a call, and so forth. The generation, collection, and storage of CDRs and other control plane data may require significant network resources in addition to those resources that are utilized to convey actual user traffic. As such, big data approaches to network analytics may lack real-time capabilities, e.g., due to the sheer volume of data. Such approaches may also lack scalability, e.g., as a result of being customized for specific applications, e.g., lacking adaptability to adhere to time, location and specific needs of an application. In addition, virtualization of core telecommunication network components opens up numerous connectivity paths between domains that did not exist for a traditional "physical" network, thereby further increasing the complexity of network management.

SUMMARY

In one example, the present disclosure discloses a device, computer-readable medium, and method for selecting a plurality of network devices to perform a plurality of tasks in accordance with a set of functional network analytics instructions. For example, a processor deployed in a telecommunication network may receive a set of functional network analytics instructions, the set of functional network analytics instructions: identifying at least one type of control plane data, specifying a manner to collect control plane data of the at least one type of control plane data, identifying a plurality of network devices from which to collect the control plane data, defining operations to manipulate the control plane data to create resulting data, and specifying at least one recipient device to receive the resulting data. In one example, the set of functional network analytics instructions is compiled from a set of instructions in accordance with a functional network analytics platform application programming interface. The processor may further select the plurality of network devices to perform a plurality of tasks in accordance with the set of functional network analytics instructions, send the plurality of tasks to the plurality of network devices, receive the control plane data from the plurality of network devices in accordance with the set of functional network analytics instructions, correlate the control plane data in accordance with the operations defined in the set of functional network analytics instructions to create the resulting data, and forward the resulting data to the at least one recipient device in accordance with the set of functional network analytics instructions.

In another example, the present disclosure discloses a device, computer-readable medium, and method for generating a set of instructions in accordance with a functional network analytics platform application programming interface. For example, a processor deployed in a telecommunication network may generate a set of instructions in accordance with a functional network analytics platform application programming interface, the set of instructions: identifying at least one type of control plane data, specifying a manner to collect control plane data of the at least one type of control plane data, identifying a plurality of network devices from which to collect the control plane data, defining operations to manipulate the control plane data to create resulting data, and specifying at least one recipient device to receive the resulting data. The processor may further compile the set of instructions in accordance with the functional network analytics platform application programming interface into a set of functional network analytics instructions, select an agent device of the telecommunication network to perform operations defined in the set of functional network analytics instructions, and send the set of functional network analytics instructions to the agent device.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, computer-readable media and methods for selecting a plurality of network devices to perform a plurality of tasks in accordance with a set of functional network analytics instructions in a telecommunications network, and devices, computer-readable media and methods for generating a set of instructions in accordance with a functional network analytics platform application programming interface in a telecommunications network. For instance, examples of the present disclosure provide a platform to instruct and instrument a set of network devices to perform network analytics functions in a telecommunication network. In particular, examples of the present disclosure provide a robust environment for emerging and scalable deep observability that is structured in a unified and collaborative abstraction model. In one example, a functional network analytics (FNA) platform provides a unified interface to enable a network analytics application (or an administrator) to instrument network devices to collect network control plane data, to correlate or to otherwise process the control plane data, and to transport results to collection devices or to the network analytics application in a meaningful way. For instance, a network analytics application may generate FNA instructions to configure network-based devices to collect control plane data and to perform real-time analytics that are dynamic and programmable. In one example, the network-based devices may comprise configurable virtual machines (VMs), general purpose smart network interface cards (NICs), routers, switches, compute or storage environments, and so forth.

Big data approaches to network analytics may lack real-time capabilities, e.g., due to the sheer volume of data. Such approaches may also lack scalability, e.g., as a result of being customized for specific applications. In contrast, examples of the present disclosure provide a unified approach to network analytics to instruct and configure network devices to perform diverse network analytics functions in real time. For example, in accordance with the present disclosure, network analytics applications can use a FNA platform abstraction interface, e.g., an application programming interface (API), to define a network analytics function, e.g., a set of instructions comprising a series of parameters, conditions, actions, etc., at a high level, and compile the high level set of instructions into a FNA platform-based instruction set that provides "n" instruction categories. For instance, the categories include instructions for input flow data acquisition, e.g., the types of control plane data desired, how to collect the data, e.g., divert the data, make a copy of the data, etc., the target network devices, or "agents," to perform the network analytics functions, and so forth). The categories also include instructions to configure network devices to process the collected control plane data, instructions on how the processing is to be adapted in response to certain conditions, and instructions on how results are distributed or abstracted for consumption by the requesting network analytics application or another recipient device.

In one example, a network analytics application defines a set of instructions via a FNA platform API. The instructions are compiled into a FNA platform-based instruction set (also referred to herein as a "set of FNA instructions") that is understandable to network devices/agents that are FNA platform enabled. The network analytics application then selects one or more available agents for execution of the FNA platform-based instruction set. For example, the FNA platform-based instruction set may comprise a device plug-in for configuring one or more FNA platform-enabled agents. The agent(s) is/are then responsible for execution of the FNA platform-based instruction set into actionable triggers. In one example, the agent(s) may select one or more "worker" devices to execute specific tasks as part of the FNA-platform based instruction set. In one example, the "worker" devices may be selected based upon the particular capabilities, locations, and access to different types of control plane data which may be called for by the FNA platform-based instruction set. For instance, an agent may select a first network device as a "worker" to collect a first type of control plane data and a second network device as a "worker" to collect a second type of control plane data. The first and second network devices may then forward the first and second types of control plane data to the agent, where the agent may then correlate and otherwise process the first and second types of control plane data as part of an overall network analytics function defined in the FNA platform-based instruction set. Thus, in one example, the worker device(s) are configured with specific skills for the durations of the respective tasks by the agent(s). In one example, the agent(s) are open interface and their performance is managed via the FNA platform-based instruction set. In one example, the worker devices may also comprise virtual machines (VMs), e.g., operating on a host devices/network function virtualization infrastructure (NFVI). In one example, the host devices may primarily be configured to provide VMs for various functions, or may comprise devices which are primarily dedicated to performing a particular network function, e.g., a router, switch, etc., but which may have a portion of the hardware resources set aside for being configured and reconfigured as VM(s).

In one example, the FNA platform provides a library with various network analytics function primitives. The primitives may have boundaries that are limited in scope (such as a primitives for an adder, a subtraction counter, a jitter sensor, an inter-arrival average rate measurement, a round trip delay measurement, etc.) but which can be made dynamic through instructions entered via the API. In one example, the library of primitives may grow as it is enhanced through repeated creation of FNA platform-based instruction sets. In addition, the capabilities of agents and workers may be enhanced within the context of performance/execution of one or more tasks in accordance with a particular FNA platform-based instruction set. For instance, the FNA platform-based instruction set may provide instructions to perform differently depending upon various triggers/conditions which may be encountered. Thus, the agent and/or the worker devices may adapt to the changing network conditions.

Examples of the present disclosure may operate in a highly scalable environment, such as a telecommunication network data center, with a large number of dedicated servers, switches, storage devices, smart NICs and so forth that are enabled with computing and memory hardware for execution of algorithms in a trusted execution environment. In one example, a hypervisor provides security to authenticate the agent(s) requesting the services of worker devices, e.g., virtual machines (VMs). The benefits extend to support large number of vertical markets including automation, and control over a large number of resources that are unified in skills and capabilities and with programmability across various servers, storage devices, and networking equipment. Examples of the present disclosure therefore enable real-time and collaborative network analytics. The devices utilized in examples of the present disclosure may also capitalize on open technologies such as hypervisors, operating systems, communication protocols, and the like, as well as the present open FNA platform as described herein. These and other aspects of the present disclosure are discussed in greater detail below in connection with the examples of FIGS. 1-4.

Figure 1:
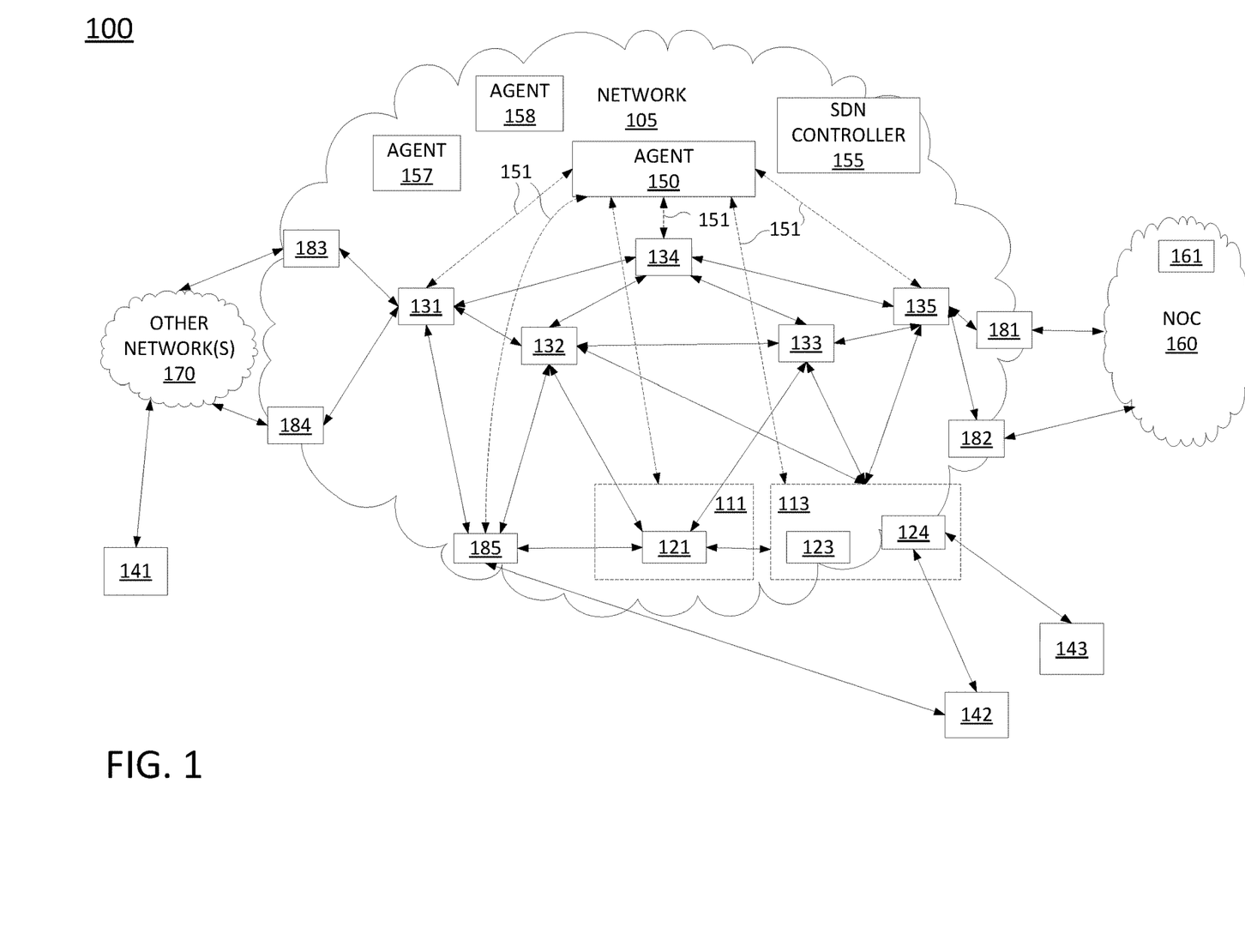
FIG. 1 illustrates an example system related to the present disclosure.

To aid in understanding the present disclosure, FIG. 1 illustrates a block diagram depicting one example of a network, or system 100 suitable for performing or enabling the steps, functions, operations, and/or features described herein. The overall communications system 100 may include any number of interconnected networks which may use the same or different communication technologies. As illustrated in FIG. 1, system 100 may include a network 105, e.g., a core telecommunication network. In one example, the network 105 may comprise a backbone network, or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additional comprise components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth. In one example, the network 105 uses network function virtualization infrastructure (NFVI), e.g., servers in a data center or data centers that are available as host devices to host virtual machines (VMs) comprising virtual network functions (VNFs). In other words, at least a portion of the core telecommunications network 105 may incorporate software-defined network (SDN) components.

In this regard, it should be noted that as referred to herein, "traffic" may comprise all or a portion of a transmission, e.g., a sequence or flow, comprising one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks. In addition, as used herein, the terms "configured" and "reconfigured" may refer to programming or loading a computing device with computer-readable/computer-executable instructions, code, and/or programs, e.g., in a memory, which when executed by a processor of the computing device, may cause the computing device to perform various functions.

In one embodiment, the network 105 may be in communication with one or more other networks 170. The other networks 170 may include a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. The other networks 170 may be controlled or operated by a same entity as that of network 105 or may be controlled or operated by one or more different entities. In one example, the other networks 170 may represent the Internet in general.

In one example, the network 105 is also in communication with a network operations center (NOC) network 160. For example, the network 105 may be operated by a telecommunications service provider. The NOC network 160 may host various operator devices, monitoring devices, and so on for use by network personnel of the telecommunications service provider in operating the network 105. For instance, device 161 may comprise an operator computing terminal for use by personnel in managing the network 105. In another example, device 161 may comprise a server hosting one or more automated network analytics applications, e.g., a "network analytics device," and may be configured to perform one or more operations or functions for generating a set of instructions in accordance with a functional network analytics platform application programming interface, in accordance with the present disclosure and as described in greater detail below. Although the NOC network 160 and the network 105 may be operated by the same entity, in one example, the NOC network 160 may comprise a separate domain, e.g., a separate routing domain as compared to the core telecommunications network 105. In one example, network 105 may transport traffic to and from user devices 141-143. For instance, the traffic may relate to communications such as voice telephone calls, video and other multimedia, text messaging, email, and so forth among the user devices 141-143, or between the user devices 141-143 and other devices that may be accessible via other networks 170. User devices 141-143 may comprise, for example, cellular telephones, personal computers, other wireless and wired computing devices, private branch exchanges, customer edge routers, media terminal adapters, cable boxes, home gateways and/or routers, and so forth.

In accordance with the present disclosure, user devices 141-143 may access network 105 in various ways. For example, user device 141 may comprise a cellular telephone which may connect to network 105 via other networks 170, e.g., a cellular access network. For instance, in such an example other networks 170 may include one or more cell sites, e.g., comprising, a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 183 and 184 in network 105 may comprise a serving gateway (SGW), a mobility management entity (MME), or the like. In one example, user device 142 may comprise a customer edge (CE) router which may provide access to network 105 for additional user devices (not shown) which may be connected to the CE router. For instance, in such an example, component 185 may comprise a provider edge (PE) router.

As mentioned above, various components of network 105 may comprise virtual network functions (VNFs) which may physically comprise hardware executing computer-readable/computer-executable instructions, code, and/or programs to perform various functions. As illustrated in FIG. 1, units 123 and 124 may reside on network function virtualization infrastructure (NFVI) 113, which is configurable to perform a broad variety of network functions and services. For example, NFVI 113 may comprise shared hardware, e.g., one or more host devices comprising line cards, central processing units (CPUs), or processors, memories to hold computer-readable/computer-executable instructions, code, and/or programs, and so forth. For instance, in one example unit 123 may be configured to be a firewall, a media server, a Simple Network Management protocol (SNMP) trap, etc., and unit 124 may be configured to be a PE router, e.g., a virtual provide edge (VPE) router, which may provide connectivity to network 105 for user devices 142 and 143. In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., configured/programmed via computer-readable/computer-executable instructions, code, and/or programs) to provide for load balancing between two processors and several line cards that may reside on separate host devices.

In one example, network 105 may also include additional NFVI 111. For instance, unit 121 may be hosted on NFVI 111, which may comprise host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a call control element (CCE), a media server, a domain name service (DNS) server, a packet data network gateway (PGW), a gateway mobile switching center (GMSC), a short message service center (SMSC), etc.

In one example, NFVI 111 and unit 121, and NFVI 113 and units 123 and 124 may also be controlled and managed by a software defined network (SDN) controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. In one example, SDN controller 155 may maintain communications with VNFs and/or host devices/NFVI via a number of control links which may comprise secure tunnels for signaling communications over an underling IP infrastructure of network 105. In other words, the control links may comprise virtual links multiplexed with transmission traffic and other data traversing network 105 and carried over a shared set of physical links. For ease of illustration the control links are omitted from FIG. 1. In one example, the SDN controller 155 may also comprise a virtual machine operating on NFVI/host device(s), or may comprise a dedicated device. For instance, SDN controller 155 may be collocated with one or more VNFs, or may be deployed in a different host device or at a different physical location.

Figure 4:
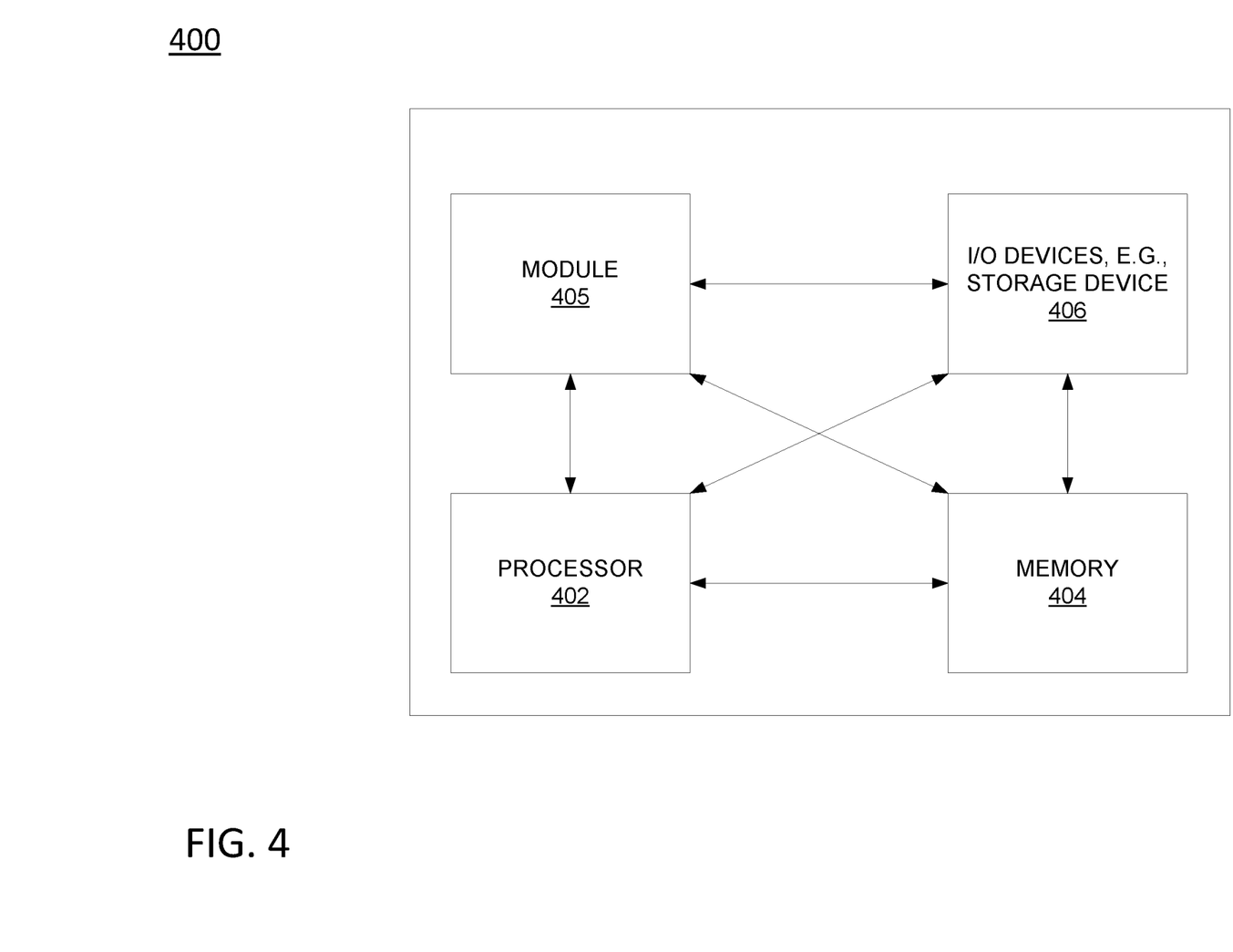
FIG. 4 illustrates an example high-level block diagram of a computer specifically programmed to perform the steps, functions, blocks, and/or operations described herein.

In one example, the SDN controller 155 may comprise a computing system or server, such as computing system 400 depicted in FIG. 4, and may be configured to provide one or more operations or functions in accordance with the present disclosure. For example, the functions of SDN controller 155 may include the selection of NFVI from among various NFVI available in network 105 (e.g., NFVI 111 or 113) to host various devices, such as routers, gateways, switches, etc., and the instantiation of such devices. For example, with respect to units 123 and 124, SDN controller 155 may download computer-executable/computer-readable instructions, code, and/or programs (broadly "configuration code") for units 123 and 124 respectively, which when executed by a processor of the NFVI 113, may cause the NFVI 113 to perform as a PE router, a gateway, a route reflector, a SGW, a MME, a firewall, a media server, a DNS server, a PGW, a GMSC, a SMSC, a CCE, and so forth. In one example, SDN controller 155 may download the configuration code to the NFVI 113. In another example, SDN controller 155 may instruct the NFVI 113 to load the configuration code previously stored on NFVI 113 and/or to retrieve the configuration code from another device in network 105 that may store the configuration code for one or more VNFs. The functions of SDN controller 155 may also include releasing or decommissioning unit 123 and/or unit 124 when no longer required, the transferring of the functions of units 123 and/or 124 to different NFVI, e.g., when NVFI 113 is taken offline, and so on.

As illustrated in FIG. 1, network 105 may also include internal nodes 131-135, which may comprise various components, such as routers, switches, route reflectors, etc., cellular core network, IMS network, and/or VoIP network components, and so forth. In one example, these internal nodes 131-135 may also comprise VNFs hosted by and operating on additional NFVIs. For instance, as illustrated in FIG. 1, internal nodes 131 and 135 may comprise VNFs residing on additional NFVI (not shown) that are controlled by SDN controller 155 via additional control links. However, at least a portion of the internal nodes 131-135 may comprise dedicated devices or components, e.g., non-SDN reconfigurable devices. Similarly, network 105 may also include components 181 and 182, e.g., PE routers interfacing with NOC network 160, and component 185, e.g., a PE router which may interface with user device 142. For instance, in one example, network 105 may be configured such that user device 142 (e.g., a CE router) is dual-homed. In other words, user device 142 may access network 105 via either or both of unit 124 and component 185. As mentioned above, components 183 and 184 may comprise a serving gateway (SGW), a mobility management entity (MME), or the like. However, in another example, components 183 and 184 may also comprise PE routers interfacing with other network(s) 170, e.g., for non-cellular network-based communications. In one example, components 181-185 may also comprise VNFs hosted by and operating on additional NFVI. However, in another example, at least a portion of the components 181-185 may comprise dedicated devices or components.

In one example, network 105 further includes agent devices 150, 157, and 158. Agent devices 150, 157, and 158 may reside within network 105 and may be made available to network analytics devices and/or applications of such network analytics devices, for performing various functions in connection with examples of the present disclosure for selecting a plurality of network devices to perform a plurality of tasks in accordance with a set of functional network analytics (FNA) instructions. For example, device 161 in NOC network 160 may create a set of FNA instructions and may then seek to assign the set of FNA instructions to an agent device in network 105 for execution. For instance, creating a set of FNA instructions may include first generating a set of instructions in accordance with a FNA platform API. In one example, the set of instructions in accordance with the FNA platform API comprises a text-based programming language script, or program that sets forth network analytics operations in accordance with the FNA platform, e.g., operations that are defined and/or permitted by the FNA platform. The set of instructions in accordance with the FNA platform API may, for example: identify at least one type of control plane data, specify a manner to collect control plane data of the at least one type of control plane data, identify a plurality of network devices from which to collect the control plane data, define operations to manipulate the control plane data to create resulting data, and specify at least one recipient device to receive the resulting data. Creating the set of FNA instructions may further include compiling the set of instructions in accordance with the FNA platform API into the set of FNA instructions, which may be then deployed to an agent device in network 105 for execution.

In one example, the set of FNA instructions comprises a smaller data volume as compared to the set of instructions in accordance with the FNA platform API. For example, the set of FNA instructions may comprise a series of fields corresponding to different operations defined by the FNA platform. In one example, entries in each field of the set of fields of the set of functional network analytics instructions comprises a series of computer/machine-readable alphanumeric codes representative of respective operations of the different operations defined by the FNA platform. In one example, the machine-readable alphanumeric codes are understandable to devices which are enabled in accordance with the FNA platform. For example, agent devices 150, 157, and 158 may be configured with software which enables agent devices 150, 157, and 158 to determine the type of operations and to execute the operations which are represented by the machine-readable alphanumeric codes.

In one example, device 161 may communicate with agent devices 150, 157, and/or 158 respectively to determine the capabilities and availability of the respective agent devices to perform the set of FNA instructions. In another example, one or more of agent devices 150, 157, and 158 may comprise VNFs hosted in NFVI/host device(s) of network 105 and managed by SDN controller 155. Accordingly, in such an example, device 161 may communicate with SDN controller 155 to determine the capabilities and availability of the respective agent devices 150, 157, and 158 to perform the set of FNA instructions. Alternatively, or in addition, device 161 may instruct or request the SDN controller 155 to select any available agent device that is capable of performing the functions in accordance with the set of FNA instructions. In one example, the agent devices 150, 157, and 158 may each comprise a computing system or server, such as computing system 400 depicted in FIG. 4, and may be configured to provide one or more functions for selecting a plurality of network devices to perform a plurality of tasks in accordance with a set of FNA instructions, as described herein. For ease of illustration, various links between agent devices 150, 157, and 158, and SDN controller 155 and other links for device 161 to communicate with such components are omitted from FIG. 1.

For illustrative purposes, in the example of FIG. 1 agent device 150 may be selected by the device 161, by SDN controller 155, and/or by the device 161 in conjunction with SDN controller 155, to execute the set of FNA instructions. As such, various control links 151 between agent device 150 and other components of network 105 are shown in FIG. 1. For example, control links 151 for agent device 150 may similarly comprise secure tunnels for signaling communications over an underling IP infrastructure of network 105, e.g., virtual links multiplexed with transmission traffic and other data traversing network 105 and carried over a shared set of physical links, in a similar manner to control links between SDN controller 155 and various NFVI of network 105 mentioned above. In one example, agent device 150 may be selected from among the group of agent devices 150, 157, and 158 based upon criteria such as: a location of the agent device 150, an access to one of the at least one type of control plane data, a capability of the agent device 150 to perform operations defined in the set of FNA instructions, an available processor and/or a memory capacity, and so on.

In one example, device 161, or device 161 via the SDN controller 155, may send the set of FNA instructions to agent device 150 after agent device 150 is selected. Agent device 150 may then begin performing operations in accordance with the set of FNA instructions. To illustrate, agent device 150 may select a plurality of network devices to perform a plurality of tasks in accordance with the set of FNA instructions, send the plurality of tasks to the plurality of network devices, receive control plane data from the plurality of network devices in accordance with the set of FNA instructions, correlate the control plane data in accordance with the operations defined in the set of FNA instructions to create resulting data, and forward the resulting data to at least one recipient device in accordance with the set of FNA instructions.

For instance, agent device 150 may select any one or more components of network 105 as "worker" devices to perform tasks in accordance with the set of FNA instructions, such as internal nodes 131-135, components 181-185, units 121, 123, and 124, etc. The tasks may include, for example: collecting particular types of control plane data, storing the control plane data, extracting portions of the control plane data, correlating the control plane data, anonymizing the control plane data, forwarding the control plane data to other devices, such as to the agent device 150, or to other worker devices for aggregation and forwarding to the agent device 150, and so on. In one example, the tasks may be explicitly specified in the set of FNA instructions. In another example, the agent device 150 may generate the tasks in accordance with the FNA instructions and distribute the tasks to the worker devices when generated.

In one example, agent device 150 may select the worker devices based upon the same or similar criteria as may be used to select agent device 150, e.g., a location of a worker device, an access of the worker device to one of the at least one type of control plane data, a capability of the worker device to perform tasks in accordance with the set of FNA instructions, an available processor and/or memory capacity, and so on. Alternatively, or in addition, worker devices may be selected based upon the worker device comprising a type of worker device that is specified in the set of FNA instructions. For instance, as mentioned above, the set of FNA instructions may include instructions identifying a plurality of network devices from which to collect the control plane data. Thus, in one example the worker devices may comprise such network devices, where each worker device may be tasked with collecting the control plane data passing through or generated therein.

The control plane data may relate to various communications for user devices 141-143, or for components of network 105, other networks 170, and so on. For instance, the control plane data may relate to: a source address or a destination address of a packet, a packet data session, etc., a source telephone number and/or a destination telephone number in a call signaling message, a packet inter-arrival time for a flow, a network link, or a component of network 105, a packet size, a protocol utilized for a communication, an application type associated with the communication, an indication of whether a file, a service, or a storage volume is accessed, a number of requests to a server, call detail record(s), particular fields within call detail record(s), such as a call connection status, a call disposition code, etc., a number of blocked calls or dropped calls for a particular telephone number, account, trunk, switch, etc., an average signal-to-noise ratio reported by mobile endpoint devices with respect to a base station and recorded by a network-based component, and so forth. Control plane data may also include out-of-band signaling traffic (e.g., which may take a different path through network 105 than payload traffic to which the out-of-band signaling traffic may relate), or other types of network management traffic, such as Simple Network Management Protocol (SNMP), Network Configuration Protocol (NETCONF), and ConfD flows, and the like, which may be conveyed via Telnet, Secure Shell (SSH) sessions, and the like, and which may be used to manage devices, such as to deploy configuration updates, to decommission a device, to retrieve settings and usage logs, and so on.

As mentioned above, worker devices may collect control plane data and perform other tasks with respect to the control plane data in accordance with the FNA instructions. The tasks for the worker devices may define a manner to collect the control plane data, e.g., in accordance with instructions in the set of FNA instructions. For instance, in accordance with the FNA instructions, the task(s) for one or more worker devices may specify that a first type of control plane data should be taken from five second samples, while another type of control plane data should be taken from a one minute weighted average of continuous data. The worker devices may also send the control plane data to agent device 150, or to other worker devices for eventual forwarding to agent device 150. To illustrate, in one example, the instructions in the set of FNA instructions specifying a manner to collect the control plane data may define that worker devices are to collect the control plane data and store the control plane data until requested by the agent device 150. In another example, the instructions specifying a manner to collect the control plane data may define that a worker device is to forward the control plane data to the agent device 150 as the control plane data is generated, received or detected by the worker device.

In any case, agent device 150 receives the control plane data from the worker devices, where the control plane data that is received may or may not have been subject to various processing via the tasks assigned to the worker devices. In one example, agent device 150 may perform further operations with respect to the control plane data. For instance, at a minimum, agent device 150 may correlate the control plane data received from the plurality of worker devices. In one example, the correlating may comprise segregating or grouping the control plane data by time, source and/or destination IP address, source and/or destination telephone number, area code, numbering plan area-exchange (NPA-NXX), etc.

The operations of agent device 150 in accordance with the set of FNA instructions may further include extracting data from a selected field or fields of CDRs after the CDRs are collected, performing a hash or a similar operation to anonymize customer proprietary network information, and so forth. In one example, the worker devices and agent device 150 may be capable of performing the same or similar operations, or tasks, with respect to the control plane data. Thus, in one example, a division of tasks/operations for manipulating or otherwise processing the control plane data may be set forth in the set of FNA instructions. For instance, tasks/operations may be allocated for execution by an agent device or by one or more of the worker devices by the network analytics application generating the set of FNA instructions. In another example, the compiling of the set of instructions in accordance with a FNA platform API may result in the automatic division of operations/tasks between an agent device and one or more worker devices. For instance, the nature of an operation defined in the set of instructions in accordance with a FNA platform API may dictate to a compiler of the FNA platform (without explicit specification by the network analytics application) whether the operation is for the agent device, or whether the operation is for assignment to, or can be assigned as a task for one or more worker devices.

Control plane data may therefore be collected by agent device 150 and further processed via operations in accordance with the FNA instructions. As referred to herein, control plane data that has been subjected to operations by an agent device in accordance with a set of FNA instructions may be referred to as "resulting data." Continuing with the above example, agent device 150 may send the resulting data to device 161 when operations in accordance with the FNA instructions are completed. Agent device 150 may release any worker devices that were implicated in the performance of tasks in accordance with the set of FNA instructions. In addition, device 161 and or SDN controller 155 may release agent device 150 for reassignment or for deactivation, if not needed to execute other FNA instruction sets for the same or a different requesting device. Notably, control plane data may be collected and processed in a tiered fashion, e.g., at worker devices, at an agent device, and at a requesting device and/or network analytics application. This is in contrast to big data approaches in which, for example, an application may access a large volume of data collected and stored in a mass data storage platform and search through voluminous records looking for control plane data which matches one or more requesting criteria, where only a small portion of the records may actually be relevant. For instance, examples of the present disclosure are able to collect and process relevant control plane data at or near the source and as the control plane data is generated in the network. The control plane data is therefore already filtered and may be pre-processed to have greater relevance to the network analytics application when delivered.

It should be noted that the system 100 has been simplified. In other words, the system 100 may be implemented in a different form than that illustrated in FIG. 1. For example, the system 100 may be expanded to include additional networks, such as additional NOC networks, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. For example, agents 157 and 158 may be integrated into a single host device/NFVI. In still another example, SDN controller 155, agents 150, 157, and 158, and/or other network elements may comprise functions that are spread across several devices that operate collectively as a SDN controller, an agent device, etc. Thus, these and other modifications of the system 100 are all contemplated within the scope of the present disclosure.

Figure 2:
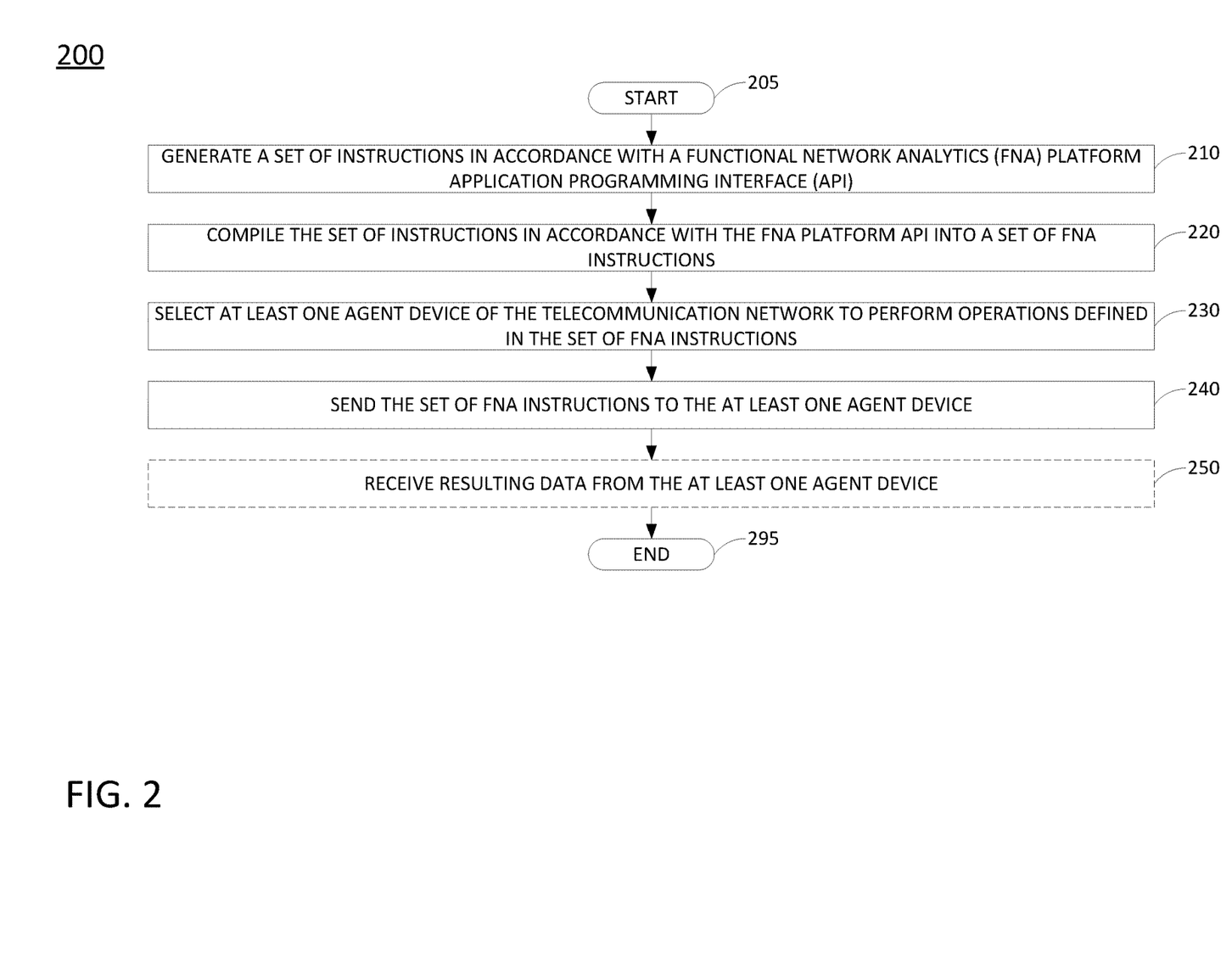
FIG. 2 illustrates a flowchart of an example method for selecting a plurality of network devices to perform a plurality of tasks in accordance with a set of functional network analytics instructions.

FIG. 2 illustrates a flowchart of an example method 200 of the present disclosure for generating a set of instructions in accordance with a functional network analytics platform application programming interface. In one example, steps, functions and/or operations of the method 200 may be performed by a network-based device, such as device 161 in FIG. 1, or device 161 in conjunction with other components of the system 100. In one example, the steps, functions, or operations of method 200 may be performed by a computing device or system 400, and/or processor 402 as described in connection with FIG. 4 below. For instance, computing device or system 400 may represent a network analytics device. For illustrative purposes, the method 200 is described in greater detail below in connection with an example performed by a processor, such as processor 402. The method begins in step 205 and proceeds to step 210.

At step 210, the processor generates a set of instructions in accordance with a functional network analytics (FNA) platform application programming interface (API). In one example, the set of instructions in accordance with the FNA platform API comprises a text-based programming language script, or program that sets forth network analytics operations, e.g., operations that are defined and/or permitted by the FNA platform. The set of instructions may, for example: identify at least one type of control plane data, specify a manner to collect control plane data of the at least one type of control plane data, identify a plurality of network devices from which to collect the control plane data, define operations to manipulate the control plane data to create resulting data, and specify at least one recipient device to receive the resulting data.

At step 220, the processor compiles the set of instructions in accordance with the FNA platform API into a set of functional network analytics (FNA) instructions. In one example, the set of FNA instructions comprises a smaller data volume as compared to the set of instructions in accordance with the FNA platform API. For example, the set of FNA instructions may comprise a series of fields corresponding to different operations defined by the FNA platform. In one example, entries in each field of the set of fields of the set of FNA instructions comprises a series of computer/machine-readable alphanumeric codes representative of respective operations of the different operations defined by the FNA platform.

At step 230, the processor selects an agent device of the telecommunication network to perform operations defined in the set of FNA instructions. In one example, the agent device may be selected from among various agent devices based upon one or more criteria such as: a location of the agent device, an access to one of the at least one type of control plane data, a capability of the agent device to perform operations defined in the set of FNA instructions, an available processor and/or memory capacity, and so on. In one example, the processor may select the agent device via instructions to a SDN controller of the telecommunication network. For example, one or more candidate agent devices may comprise VNFs implemented on one or more host devices/NFVI.

At step 240, the processor sends the set of FNA instructions to the agent device. In one example, the agent device may then perform operations in accordance with the set of FNA instructions. For example, the agent device may select a plurality of network devices (e.g., "worker devices") to perform a plurality of tasks in accordance with the set of FNA instructions, send the plurality of tasks to the plurality of network devices, receive control plane data from the plurality of network devices in accordance with the set of FNA instructions, correlate the control plane data in accordance with the operations defined in the set of FNA instructions to create resulting data, and forward the resulting data to at least one recipient device in accordance with the set of FNA instructions. In one example, the agent device may be configured with software which enables the agent device to determine the type of operations and to execute the operations which are represented by machine-readable alphanumeric codes of the set of FNA instructions.

Following step 240, the method 200 may proceed to step 295 or to optional step 250.

At optional step 250, the processor may receive the resulting data from the agent device. For example, the at least one recipient device to which the agent device forwards the resulting data may comprise the device of the processor, e.g., a network analytics device.

Following step 240 or optional step 250, the method 200 may proceed to step 295. At step 295, the method 200 ends.

It should be noted that the method 200 may be expanded to include additional steps. For instance, in one example the processor may further generate alerts or alarms based upon the resulting data, may generate and send reports to various personnel of an operator of the telecommunication network, and so forth. Alternatively, or in addition, the processor may further generate new or additional sets of instructions in accordance with the FNA platform API. For example, the processor may have generated the set of instructions in accordance with the FNA platform API in order to monitor control plane data of the telecommunication network to detect possible congestion on a set of links serving traffic for a particular customer. However, the processor may also expand the monitoring to include possible congestion on other nearby links to account for the possibility that the problem may be more widespread, but not yet reported. As such, the processor may generate one or more additional sets of instructions in accordance with the FNA platform API to separately monitor the conditions of the different nearby links. For instance, an additional set of instructions in accordance with the FNA platform API may be compiled into an additional set of FNA instructions and sent to the same or a different agent device for execution, where a different set of network devices (e.g., network devices associated with the different link(s)) may be assigned tasks in accordance with the additional set of FNA instructions, and so on. In still another example, the method 200 may instead involve an agent device, e.g., a target hardware comprising a central processing unit (CPU), a graphics processing unit (GPU), a field programmable gate array (FPGA), a system-on-chip (SOC), etc., compiling the set of instructions in accordance with the FNA platform API into the set of FNA instructions. Thus, these and other modifications are all contemplated within the scope of the present disclosure.

Figure 3:
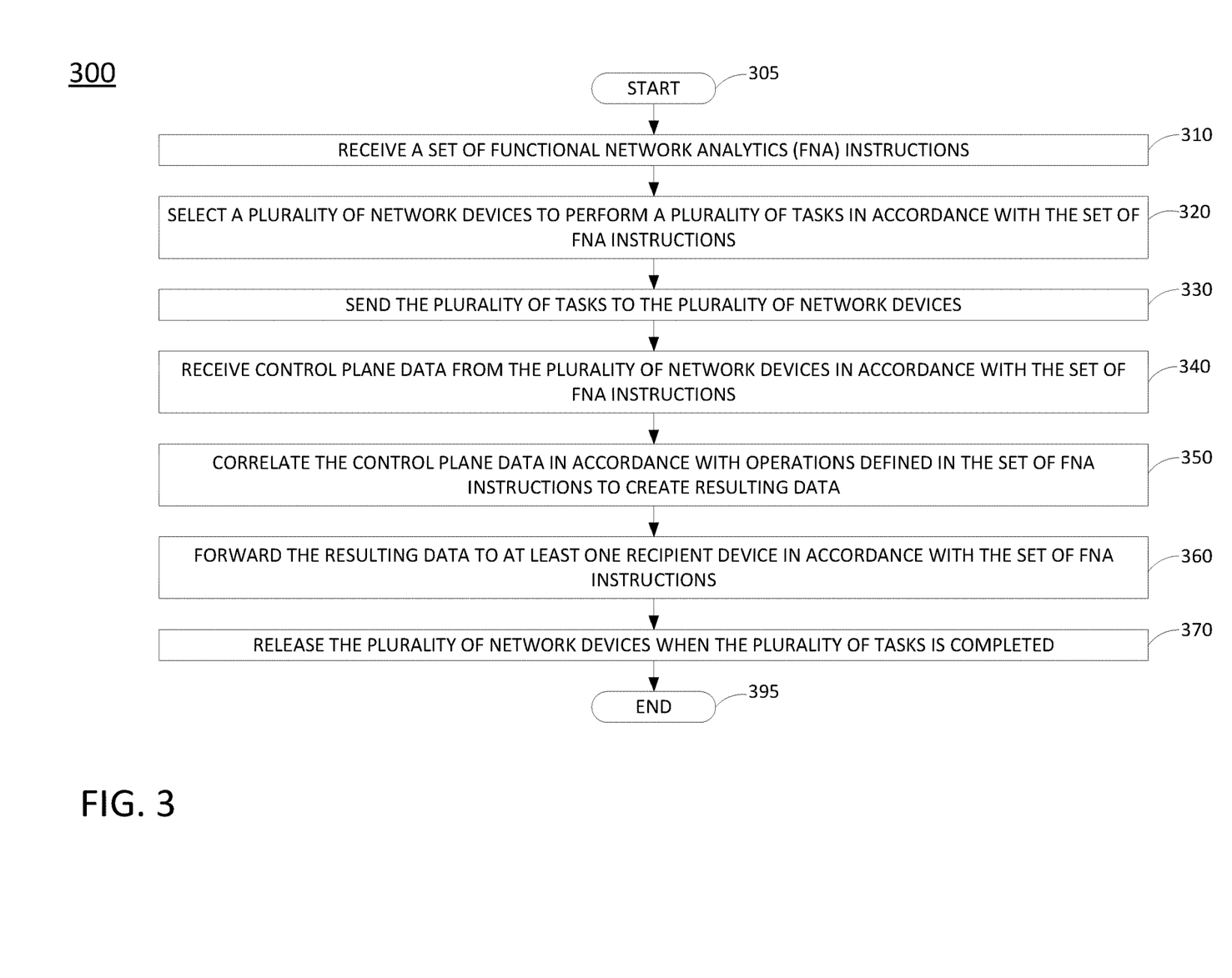
FIG. 3 illustrates a flowchart of an example method for generating a set of instructions in accordance with a functional network analytics platform application programming interface.

FIG. 3 illustrates a flowchart of an example method selecting a plurality of network devices to perform a plurality of tasks in accordance with a set of functional network analytics instructions, in accordance with the present disclosure. In one example, steps, functions and/or operations of the method 300 may be performed by a network-based device, such as agent device 150 in FIG. 1, or an agent device 150 in conjunction with other components of the system 100. In one example, the steps, functions, or operations of method 300 may be performed by a computing device or system 400, and/or processor 402 as described in connection with FIG. 4 below. For example, computing device or system 400 may represent an agent device in accordance with the present disclosure. For illustrative purposes, the method 300 is described in greater detail below in connection with an example performed by a processor, such as processor 402. The method 300 begins in step 305 and proceeds to step 310.

At step 310, the processor receives a set of functional network analytics (FNA) instructions. In one example, the set of FNA instructions identifies at least one type of control plane data, specifies a manner to collect control plane data of the at least one type of control plane data, identifies a plurality of network devices from which to collect the control plane data, defines operations to manipulate the control plane data to create resulting data, and specifies at least one recipient device to receive the resulting data. In one example, the set of FNA instructions may have been created by compiling a set of instructions in accordance with a FNA platform API into the set of FNA instructions before being sent to and received by the processor.

In one example, the set of FNA instructions comprises a smaller data volume as compared to the set of instructions in accordance with the FNA platform API. For example, the set of FNA instructions may comprise a series of fields corresponding to different operations defined by the FNA platform. In one example, entries in each field of the set of fields of the set of FNA instructions may comprise a series of computer/machine-readable alphanumeric codes representative of respective operations of the different operations defined by the FNA platform. In one example, the machine-readable alphanumeric codes are understandable to the processor, which may be preconfigured in accordance with the FNA platform with a table or other data structure, e.g., maintained in a memory and/or a storage unit of a device of the processor, to associate the alphanumeric codes with respective operations, or tasks.

At step 320, the processor selects the plurality of network devices to perform a plurality of tasks in accordance with the set of functional network analytics instructions. The plurality of network devices may include for example: a router, a switch, a network interface card, a base station (including a BTS, eNodeB, etc.), a RNC (including a BSC), a MME, a GMSC, a SMSC, a home subscriber server (HSS), a home location register (HLR), a visiting location register (VLR), a gateway (including a gateway GPRS support node (GGSN) or a serving GPRS support node (SGSN)), a call session control function (CSCF) (including a proxy CSCF (P-CSCF), a serving CSCF (S-CSCF), or an interrogating CSCF (I-CSCF)), a storage device (including a DNS server, a HSS, a diameter routing agent (DRA), and so forth), a satellite link terrestrial antenna (including satellite dishes and antennas for downlink communications, and uplink antennas/dishes), a satellite, a cable head-end, a media server, a SNMP trap, a route reflector, a border element, a session border controller (SBC), and various other cellular network, IMS network, or VoIP network components, and/or components of telecommunication networks in general.

The tasks may include, for example: collecting particular types of control plane data, storing the control plane data, extracting portions of the control plane data, correlating the control plane data, anonymizing the control plane data, forwarding the control plane data to other devices, such as to the processor, or to other network devices for aggregation and forwarding to the processor, and so on. In one example, the tasks may be explicitly specified in the set of FNA instructions and/or the tasks may comprise sub-sets of the set of FNA instructions. For instance, like the processor, the plurality of network devices may be similarly preconfigured in accordance with the FNA platform with a table or other data structure, e.g., maintained in a memory and/or a storage unit of each network device, to associate the alphanumeric codes with respective operations, or tasks. In another example, the processor may generate the tasks in accordance with the FNA instructions and distribute the tasks to the network devices when generated. In one example, the processor may select a network device to perform one or more of the tasks based upon a location of a network device, an access of the network device to one of the at least one type of control plane data, a capability of the network device to perform tasks in accordance with the set of FNA instructions, an available processor and/or memory capacity, and so on. Alternatively, or in addition, the processor may select a network device based upon the network device comprising a type of network device that is specified in the set of FNA instructions.

At step 330, the processor sends the plurality of tasks to the plurality of network devices. The plurality of network devices may then begin performing the respective tasks that are assigned. For instance, in accordance with the FNA instructions, the task(s) for one or more worker devices may specify that a first type of control plane data should be taken from five second samples, while another type of control plane data should be taken from a one minute weighted average of continuous data. The tasks may further include extracting data from a selected field or fields of CDRs after the CDRs are collected, performing a hash or a similar operation to anonymize customer proprietary network information, and so on.

At step 340, the processor receives control plane data from the plurality of network devices in accordance with the set of FNA instructions. The control plane data that is received may or may not have been subject to various processing via the tasks assigned to the plurality of network devices. In one example, the instructions in the set of FNA instructions specifying a manner to collect the control plane data may define that network devices are to collect the control plane data and store the control plane data until requested by the processor. In another example, the instructions specifying a manner to collect the control plane data may define that a network device is to forward the control plane data to the processor as the control plane data is generated, received or detected by the network device. In still another example, certain network devices of the plurality of network devices may send control plane data to intermediate devices for eventual forwarding to the processor and/or to other recipient devices.

At step 350, the processor correlates the control plane data in accordance with the operations defined in the set of functional network analytics instructions to create resulting data. In one example, the correlating may comprise segregating or grouping the control plane data by time, source and/or destination IP address, source and/or destination telephone number, area code, numbering plan area-exchange (NPA-NXX), etc.

At step 360, the processor forwards the resulting data to the at least one recipient device in accordance with the set of FNA instructions. For example, the at least one recipient device may comprise a device that sent the set of FNA instructions to the processor, or may comprise a different device, such as a quarantine, a sandbox, a honeypot, an operator console, or other device for review or further analysis. Following step 360, the method 300 may proceed to step 395 or to optional step 370.

At optional step 370, the processor may release the plurality of network devices when the plurality of tasks is completed. For example, the operations of the set of FNA instructions may call for the processor to continue collecting control plane data from network devices until certain criteria are satisfied. Thus, in one example, when the processor detects such criteria, the processor may signal to the plurality of network devices to cease performing the assigned tasks and to inform the plurality of network devices that that the plurality of network devices are no longer engaged for purposes of the set of FNA instructions.

Following step 360 or optional step 370 the method 300 proceeds to step 395. At step 395, the method 300 ends.

It should be noted that the method 300 may be expanded to include additional steps. For instance, in one example the processor may perform further operations with respect to the control plane data. For instance, in accordance with the set of FNA instructions, at step 350 the processor may further extract data from a selected field or fields of CDRs after the CDRs are collected, perform a hash or a similar operation to anonymize customer proprietary network information, and so forth. In one example, the network devices and the processor may be capable of performing the same or similar operations, or tasks, with respect to the control plane data. Thus, in one example, a division of tasks/operations for manipulating or otherwise processing the control plane data may be set forth in the set of FNA instructions. In another example, the compiling of the set of instructions in accordance with a FNA platform API may result in the automatic division of operations/tasks between an agent device and one or more worker devices. Thus, these and other modifications are all contemplated within the scope of the present disclosure.

In addition, although not specifically specified, one or more steps, functions or operations of the respective methods 200 and 300 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 2 or FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described methods 200 and 300 may comprise optional steps, or can be combined, separated, and/or performed in a different order from that described above, without departing from the example embodiments of the present disclosure.

As such, the present disclosure provides at least one advancement in the technical field of telecommunication network analytics, management, and operations. For instance, examples of the present disclosure include network-based devices for selecting a plurality of network devices to perform a plurality of tasks in accordance with a set of functional network analytics instructions and for generating a set of instructions in accordance with a functional network analytics platform application programming interface. For instance, control plane data may be collected and processed in a tiered fashion, e.g., at worker devices, at an agent device, and at a requesting device and/or network analytics application. This is in contrast to big data approaches in which, for example, an application may access a large volume of data collected and stored in a mass data storage platform and search through voluminous records looking for control plane data which matches a requesting criteria, where only a small portion of the records may actually be relevant. For instance, examples of the present disclosure are able to collect and process relevant control plane data at or near the source and as the control plane data is generated in the network. The control plane data is therefore already filtered and may be pre-processed to have greater relevance to the network analytics application when delivered.

In addition, embodiments of the present disclosure improve the functioning of a computing device, e.g., a server. Namely, servers dedicated to telecommunication network control plane data collection and processing are improved in the examples of the present disclosure, such as network analytics devices(s) and/or agent device(s) as described herein. For example, in accordance with the present disclosure, network analytics devices can use a FNA platform-based analytics abstraction interface/API to define a network analytics function, e.g., a set of instructions comprising a series of parameters, conditions, actions, etc. at a high level, and compile the high level set of instructions into a FNA platform-based instruction set for assignment to an agent device, which may then disseminate tasks to a plurality of worker devices, or network devices, to perform in accordance with the FNA platform-based instruction set.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for selecting a plurality of network devices to perform a plurality of tasks in accordance with a set of functional network analytics instructions or for generating a set of instructions in accordance with a functional network analytics platform application programming interface, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the above method 200 or method 300, or the entire method 200 or method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or method 300. In one embodiment, instructions and data for the present module or process 405 for selecting a plurality of network devices to perform a plurality of tasks in accordance with a set of functional network analytics instructions or for generating a set of instructions in accordance with a functional network analytics platform application programming interface (e.g., a software program comprising computer-executable instructions) can be loaded into memory 404 and executed by hardware processor element 402 to implement the steps, functions or operations as discussed above in connection with the illustrative method 200 or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for selecting a plurality of network devices to perform a plurality of tasks in accordance with a set of functional network analytics instructions or for generating a set of instructions in accordance with a functional network analytics platform application programming interface (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
 a processor deployed in a telecommunication network; and
 a computer-readable medium storing instructions which, when executed by the processor, cause the processor to perform operations, the operations comprising:
  receiving a set of functional network analytics instructions, wherein the set of functional network analytics instructions is received from an application of a network analytics device of the telecommunication network, wherein the device is distinct from the network analytics device, wherein the set of functional network analytics instructions comprises:
   identifying at least one type of control plane data;
   identifying a plurality of network devices from which to collect the control plane data;
   defining at least one operation to manipulate the control plane data to create resulting data; and
   specifying at least one recipient device to receive the resulting data, wherein the set of functional network analytics instructions was compiled from a set of instructions in accordance with a functional network analytics platform application programming interface;
  sending a plurality of tasks to the plurality of network devices to be performed in accordance with the set of functional network analytics instructions;
  receiving the control plane data from the plurality of network devices, the control plane data collected in accordance with the plurality of tasks in accordance with the set of functional network analytics instructions;
  correlating the control plane data in accordance with the at least one operation to manipulate the control plane data that is defined in the set of functional network analytics instructions to create the resulting data;
  forwarding the resulting data to the at least one recipient device in accordance with the set of functional network analytics instructions; and
  releasing the plurality of network devices when the plurality of tasks is completed, wherein the releasing comprises informing the plurality of network devices that the plurality of network devices are no longer engaged for purposes of the set of functional network analytics instructions.

2. The device of claim 1, wherein the at least one operation to manipulate the control plane data comprises at least one of:
 an operation for the plurality of network devices to manipulate the control plane data before the control plane data is received by the processor from the plurality of network devices; or
 an operation for the processor to manipulate the control plane data after the control plane data is received by the processor from the plurality of network devices.

3. The device of claim 2, wherein the plurality of tasks performed by the plurality of network devices comprises the operation for the plurality of network devices to manipulate the control plane data before the control plane data is received by the processor.

4. The device of claim 2, wherein the operation for the processor to manipulate the control plane data after the control plane data is received by the processor from the plurality of network devices includes an operation to correlate the control plane data.

5. The device of claim 1, where the set of instructions in accordance with the functional network analytics platform application programming interface is generated by the application of the network analytics device.

6. The device of claim 1, wherein the set of functional network analytics instructions further comprises a manner to collect the control plane data comprising at least one of:
 requesting the control plane data from the plurality of network devices;
 automatic forwarding of the control plane data by the plurality of network devices;
 diverting of the control plane data by the plurality of network devices; or
 copying of the control plane data by the plurality of network devices.

7. The device of claim 1, wherein the plurality of network devices includes a network function virtualization infrastructure.

8. The device of claim 1, wherein the at least one recipient device includes:
 the device of the processor; or
 a different device of the telecommunication network.

9. The device of claim 1, wherein the selecting the plurality of network devices to perform the plurality of tasks in accordance with the set of functional network analytics instructions is based upon at least one of:
 a location of one of the plurality of network devices;
 an access to one of the at least one type of control plane data by the one of the plurality of network devices; or a capability of the one of the plurality of network devices to perform at least one of the plurality of tasks.

10. The device of claim 1, wherein the set of instructions in accordance with the functional network analytics platform application programming interface is generated from at least one primitive selected from a library of primitives of the functional network analytics platform application programming interface.

11. The device of claim 1, wherein the set of functional network analytics instructions further comprises a manner to collect the control plane data that includes a size of a sample of the at least one type of control plane data that is to be collected.

12. The device of claim 1, wherein the releasing results in the plurality of network devices being deactivated or reassigned to another functional network analytics instruction set.

13. A non-transitory computer-readable medium storing instructions which, when executed by a processor deployed in a telecommunication network, cause the processor to perform operations, the operations comprising:
receiving a set of functional network analytics instructions, wherein the set of functional network analytics instructions is received from an application of a network analytics device of the telecommunication network, wherein the processor is distinct from the network analytics device, wherein the set of functional network analytics instructions comprises:
identifying at least one type of control plane data;
identifying a plurality of network devices from which to collect the control plane data;
defining at least one operation to manipulate the control plane data to create resulting data; and
specifying at least one recipient device to receive the resulting data, wherein the set of functional network analytics instructions was compiled from a set of instructions in accordance with a functional network analytics platform application programming interface;
sending a plurality of tasks to the plurality of network devices to be performed in accordance with the set of functional network analytics instructions;
receiving the control plane data from the plurality of network devices, the control plane data collected in accordance with the plurality of tasks in accordance with the set of functional network analytics instructions;
correlating the control plane data in accordance with the at least one operation to manipulate the control plane data that is defined in the set of functional network analytics instructions to create the resulting data;
forwarding the resulting data to the at least one recipient device in accordance with the set of functional network analytics instructions; and
releasing the plurality of network devices when the plurality of tasks is completed, wherein the releasing comprises informing the plurality of network devices that the plurality of network devices are no longer engaged for purposes of the set of functional network analytics instructions.

14. A method comprising:
receiving, by a processor deployed in a telecommunication network, a set of functional network analytics instructions, wherein the set of functional network analytics instructions is received from an application of a network analytics device of the telecommunication network, wherein the processor is distinct from the network analytics device, wherein the set of functional network analytics instructions comprises:
identifying at least one type of control plane data;
identifying a plurality of network devices from which to collect the control plane data;
defining at least one operation to manipulate the control plane data to create resulting data; and
specifying at least one recipient device to receive the resulting data, wherein the set of functional network analytics instructions was compiled from a set of instructions in accordance with a functional network analytics platform application programming interface;
sending, by the processor, a plurality of tasks to the plurality of network devices to be performed in accordance with the set of functional network analytics instructions;
receiving, by the processor, the control plane data from the plurality of network devices, the control plane data collected in accordance with the plurality of tasks in accordance with the set of functional network analytics instructions;
correlating, by the processor, the control plane data in accordance with the at least one operation to manipulate the control plane data that is defined in the set of functional network analytics instructions to create the resulting data;
forwarding, by the processor, the resulting data to the at least one recipient device in accordance with the set of functional network analytics instructions; and
releasing, by the processor, the plurality of network devices when the plurality of tasks is completed, wherein the releasing comprises informing the plurality of network devices that the plurality of network devices are no longer engaged for purposes of the set of functional network analytics instructions.

15. The method of claim 14, wherein the at least one operation to manipulate the control plane data comprises at least one of:
an operation for the plurality of network devices to manipulate the control plane data before the control plane data is received by the processor from the plurality of network devices; or
an operation for the processor to manipulate the control plane data after the control plane data is received by the processor from the plurality of network devices.

16. The method of claim 15, wherein the plurality of tasks performed by the plurality of network devices comprises the operation for the plurality of network devices to manipulate the control plane data before the control plane data is received by the processor.

17. The method of claim 15, wherein the operation for the processor to manipulate the control plane data after the control plane data is received by the processor from the plurality of network devices includes an operation to correlate the control plane data.

18. The method of claim 14, where the set of instructions in accordance with the functional network analytics platform application programming interface is generated by the application of the network analytics device.

19. The method of claim 14, wherein the set of functional network analytics instructions further comprises a manner to collect the control plane data comprising at least one of:
requesting the control plane data from the plurality of network devices;
automatic forwarding of the control plane data by the plurality of network devices;

diverting of the control plane data by the plurality of network devices; or copying of the control plane data by the plurality of network devices.

20. The method of claim 14, wherein the plurality of network devices includes a network function virtualization infrastructure.

* * * * *